(12) United States Patent
Jordan

(10) Patent No.: US 6,888,431 B2
(45) Date of Patent: May 3, 2005

(54) REMOTELY OPERATED CIRCUIT BREAKER FOR EMERGENCY LIGHTING CIRCUITS

(75) Inventor: Scott C. Jordan, Murfreesboro, TN (US)

(73) Assignee: Square D Company, Palatine, IL (US)

(*) Notice: Subject to any disclaimer, the term of this patent is extended or adjusted under 35 U.S.C. 154(b) by 27 days.

(21) Appl. No.: 10/354,765

(22) Filed: Jan. 30, 2003

(65) Prior Publication Data

US 2004/0149555 A1 Aug. 5, 2004

(51) Int. Cl.[7] .............................................. H01H 75/00
(52) U.S. Cl. ......................................... 335/20; 335/14
(58) Field of Search ........................... 335/6, 8–10, 14, 335/20, 202; 200/293–308

(56) References Cited

U.S. PATENT DOCUMENTS

| | | | |
|---|---|---|---|
| 4,623,859 A | 11/1986 | Erickson et al. | |
| 4,964,058 A | 10/1990 | Brown, Jr. | |
| 4,965,694 A | 10/1990 | Dvorak et al. | |
| 5,373,411 A | 12/1994 | Grass et al. | |
| 5,966,281 A | 10/1999 | Larson | |
| 6,304,915 B1 | 10/2001 | Nguyen et al. | |
| 6,412,073 B1 | 6/2002 | Rangan | |
| 6,442,577 B1 | 8/2002 | Britton et al. | |
| 6,446,204 B1 | 9/2002 | Pang et al. | |
| 6,531,938 B1 * | 3/2003 | Smith et al. | 335/14 |
| 6,563,406 B2 * | 5/2003 | Beatty et al. | 335/16 |

OTHER PUBLICATIONS

Website Article: "Code Guide," CEE News. Aug. 1, 2001. http://ccenews.com/ar/electric_code_guide_9/. printed Jan. 16, 2003. 4 pgs.

Brochure: Deb Series Fluorescent Emergency Ballasts. mcPhilben® Commercial Deb Series. D–17. about 2001. 1 pg.

Brochure: mcPhilben Lighting. DEB–1 Fluorescent Emergency Ballast ERB 3010. Day–Brite Lighting. about 2001. 2 pgs.

Brochure: Codes. mcPhilben® NEC 1996. NFPA Life Safety Code and Canadian Code. D59–61. about 1996. 3 pgs.

Brochure: Lighting control solutions that save energy. time and space—POWERLINK® G3 Lighting Control Systems. Square D Schneider Electric. Jan. 2001. 8 pgs.

Brochure: Powerlink® AS—The All–in–One. Automatic Lighting Control System. Square D Groupe Schneider. Oct. 1998. 8 pgs.

Brochure: Powerlink—Building Controls—A Complete Family of Remote Power Switching Products that Saves Space. Simplifies Wiring. Square D Company, Mar. 1991. 6 pages.

Website Catalog: Powerlink® PL Circuit Breakers/Power Supplies—PL Circuit Breakers/Power Supplies. Square D Company. http://ccatalog.squared.com/catalog/html/sections/04/17204015.htm. printed Dec. 4, 2002. 3 pages.

(Continued)

Primary Examiner—Lincoln Donovan

(57) ABSTRACT

A remote-controlled circuit breaker system, comprising a single voltage input connector for receiving current from an external power supply, at least two pole assemblies each including a trip mechanism, and a trip crossbar. The input connector provides a single power source to both pole assemblies, and the trip crossbar couples the trip mechanisms together. One of the pole assemblies further includes a remote-controlled actuator that controls only one of the two pole assemblies.

14 Claims, 5 Drawing Sheets

OTHER PUBLICATIONS

Website Article: 2003 EC&M Product of the Year Platinum Award—Square D PowerLink lighting control. 2002 Platinum Product of the Year Award. Mar. 4, 2002, http://platinumaward.ceenews.com/microsites/newsarticle.asp?mode=print&newsarticleid=2. printed Dec. 4, 2002. 1 page.

Website Article: squared.com Industry and Customer Information. Powerlink AS / Square D Company Consulting, http://www.squared.com/us/internet/indeus.nsf/documents-bycategory/1D1DOF8866A4748985256720006C5036?opendocument. printed Dec. 4, 2002. 2 pages.

Website Article: Square D Power Management—Newsroom—New Lighting System Form Square D Offers Greater Space, Energy Cost Savings. Jul. 31, 2001, http://www.powerlogic.com/newsroom.cfm?press=11 printed on Dec. 4, 2002. 2 pages.

Catalog: Lighting Control—Class 8903–Multipole Lighting Contactors. Type L & LX. Square D © 1998. pp. 2–7.

Brochure: Pow–R–Command Panelboards Networkable Power Switching, Westinghouse & Cutler–Hammer Products, Mar. 1996. 6 pages.

Website: Eaton Cutler Hammer. 2001 Cutler–Hammer Catalog. http://www.cutler–hammer.eaton.com/NASApp/cs/ContentServer?pagename=C–H/Common. printed Jan. 16, 2003. 1 page.

Brochure: GEA–11868 GE Lighting Controls TLC System Overview, GE Canada. Lighting Products Department. Feb. 1991. 6 pages.

Brochure: GE Total Lighting Control Commercial and Industrial Lighting Automation Featuring New ProSys™ Lighting Control Systems. GE Total Lighting Control © 2000. revision date of Jul. 23, 2001. 8 pages.

Catalog: ASCO 917. Mechanically–Held. Multi–Pole, 20–Amp Remote Control (RC) Lighting Contactor. Automatic Switch Co., Nov. 1997. 5 double sided pages.

Brochure: Siemens Lighting Control with instabus® Siemens Energy & Automation. Inc. © 1997. 5 pages.

* cited by examiner

REMOTELY OPERATED CIRCUIT BREAKER FOR EMERGENCY LIGHTING CIRCUITS

FIELD OF THE INVENTION

This invention is directed generally to electrical circuit breaker systems, and, more particularly, to a remotely controlled circuit breaker system for emergency lighting circuits.

BACKGROUND OF THE INVENTION

Some considerations that are of primary concern to building owners deal with reducing energy costs and conserving energy. For example, lighting directly accounts for about 40% of the electricity consumed in a typical building. Leaving lights on after hours or during long periods when they are not being used is a tremendous drain on energy and profits. Turning them off, on the other hand, is an instantaneous cost reduction. Reducing the amount of time that lamps burn each day can also substantially increase the amount of time between replacements, saving on labor, material and disposal costs. Controlling electrical loads such as lights-turning them off when not needed-conserves energy, saves money, and helps the environment. This is not only cost effective, but is often required by federal and state laws in new or renovated buildings.

One way to better manage energy consumption is to use remote-controlled circuit breakers. In general, a remote-controlled circuit breaker includes a remote-controlled actuator having a small electric motor, which responds to appropriate control signals sent from a remote location for automatically separating a pair of contacts of the circuit breaker. Therefore, the circuit breaker can switch the electrical power of an electrical circuit ON or OFF during certain time periods. The remote-controlled circuit breaker has many applications, such as controlling light systems in commercial buildings.

Some electrical applications require a multi-pole circuit breaker. When a multi-pole circuit breaker includes a remote-controlled actuator, each pole is typically remotely controlled in the same manner, i.e., the remote-controlled actuator controls all the poles in the same time. This means that all the poles will receive the same command and will operate identically. For example, if the circuit breaker has two poles, each pole controlling a different set of light fixtures, then both set of light fixtures will turn ON at the same time and will turn OFF at the same time, according to the remote-control command.

In one application, emergency lighting systems, such as exit signs and lights, are required by law in commercial buildings to provide minimum lighting for exiting a building when electrical power is interrupted. Generally, emergency lights run on battery power and remain illuminated for only a limited time, e.g., at least 90 minutes. The National Electrical Code ("NEC") Article 700-12(e), which pertains to unit equipment used for emergency lighting, states in part that the "branch circuit feeding unit equipment shall be the same branch circuit as that serving the normal lighting in the area and connected ahead of any local switches." The purpose of this article is to ensure that the emergency lights turn ON when the electrical power for the normal lighting is interrupted, e.g., power is lost, disconnected, or turned OFF.

The NEC requirement effectively prohibits the use of conventional remote-controlled circuit breakers in emergency illumination applications. A party that wants to use a multi-pole remote-controlled circuit breaker in connection with emergency lighting will encounter at least one of two problems. If the emergency lights are connected to one pole and the normal lights are connected to another pole or poles, then the emergency lights are not on the same branch circuit with the normal lights. This violates the NEC requirement. If the emergency lights and the normal lights are connected to the same pole, then the emergency lights will turn ON whenever the normal lights turn OFF. This is obviously an undesired effect when it is desired to regularly turn OFF the normal lights, during such times as when a commercial building is closed. In other words, there would be a false alarm (the emergency lights turn ON) every time the building closes.

Therefore, there is a need for a remote-controlled circuit breaker wherein all the poles receive the same electrical power, and a remote-controlled actuator controls at least one but less than all of the circuit breaker poles. For example, in a two-pole circuit breaker, both poles receive the same power, but one pole can be remotely controlled without affecting the other pole. Thus, if a first pole is coupled to emergency lights and a second pole is coupled to normal lights, the remote-controlled actuator can operate to turn the normal lights ON and OFF according to desired schedules while the emergency lights are unaffected by the remote-controlled actuator.

SUMMARY OF THE INVENTION

In an embodiment, a circuit breaker system comprises a single voltage input connector adapted to receive current from an external power supply, a first and second pole assembly, and a trip crossbar. The first pole assembly includes a first movable contact electrically coupled to the input connector, wherein the first movable contact allows the flow of current through the first pole assembly in a first closed position and prevents the flow of current in a first open position. The first pole assembly further includes a first trip mechanism operatively coupled to the first movable contact for moving the first movable contact to a first tripped position. The second pole assembly includes a second movable contact electrically coupled to the input connector, wherein the second movable contact allows the flow of the current through the second pole assembly in a second closed position and prevents the flow of current in a second open position. The second pole assembly includes a second trip mechanism operatively coupled to the second movable contact for moving the second movable contact to a second tripped position. The second pole assembly further includes a remote-controlled actuator operatively coupled to the second movable contact for toggling the second movable contact between the second open position and the second closed position. The trip crossbar couples the first trip mechanism and the second trip mechanism together so as to move them to their respective tripped positions generally simultaneously.

In another embodiment, a method of assembling a circuit breaker system comprises providing a single voltage input connector for receiving current from an external power supply, and a first pole assembly including a first movable contact and a first trip mechanism. The input connector is electrically coupled to the first movable contact, wherein the first movable contact is adapted for allowing the flow of the current through the first pole assembly in a first closed position and for preventing the flow of the current in a first open position, and the first trip mechanism is operatively coupled to the first movable contact for moving the first movable contact to a first tripped position. The method further comprises providing a second pole assembly including a second movable contact, a second trip mechanism, and a remote-controlled actuator. The input connector is electrically coupled to the second movable contact, and the second trip mechanism is operatively coupled to the second movable contact for moving the second movable contact to a second tripped position. The remote-controlled actuator is operatively coupled to the second movable contact for toggling the second movable contact between a second open position and a second closed position. The method further comprises providing a trip crossbar, and coupling the trip crossbar to the first trip mechanism and the second trip mechanism so as to move the first movable contact to the first tripped position and the second movable contact to the second tripped position generally simultaneously.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the following drawings.

Figure 1:
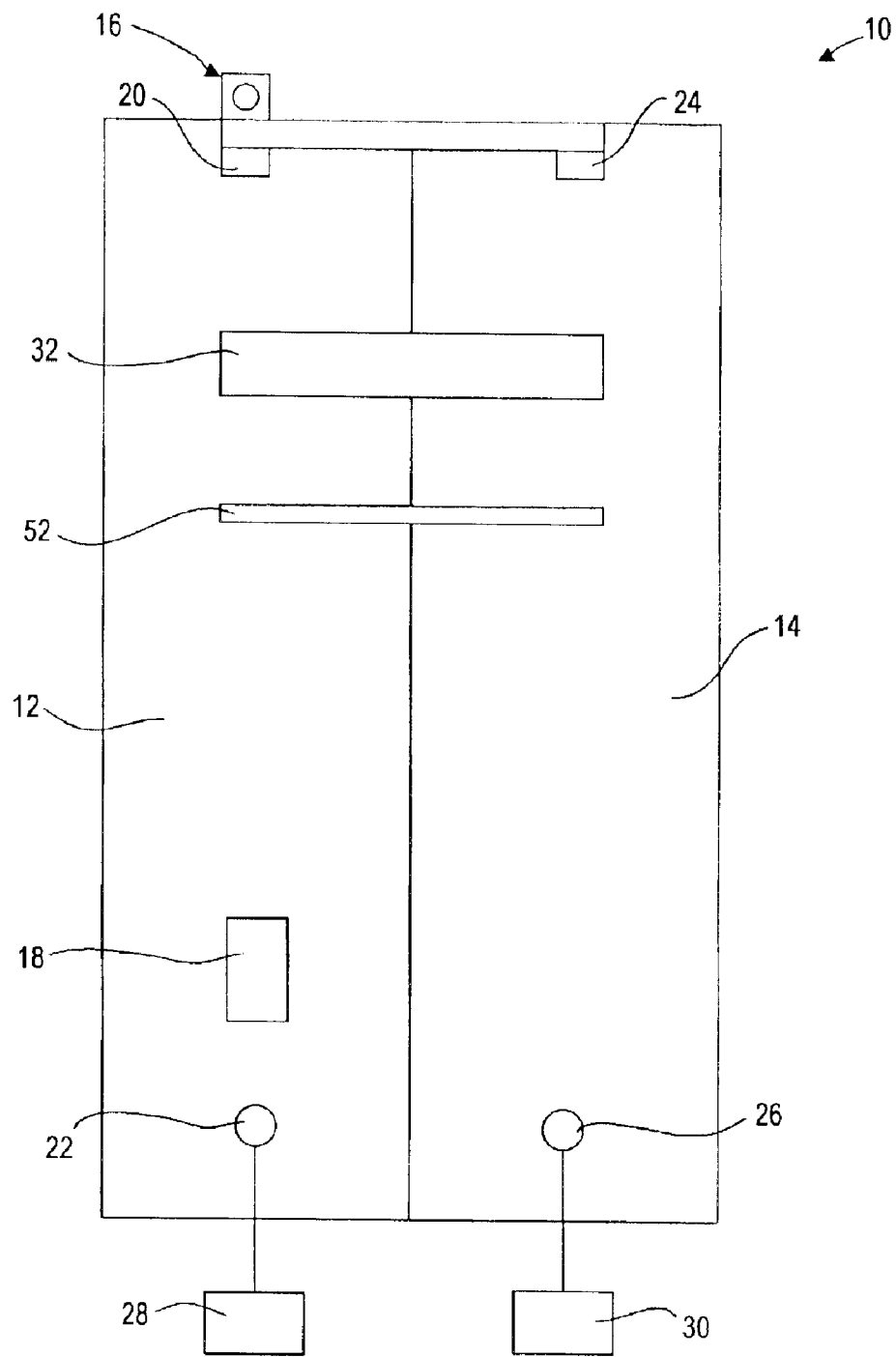
FIG. 1 is a schematic illustration of a remote-controlled circuit breaker embodying the present invention and having two pole assemblies.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Figure 2:
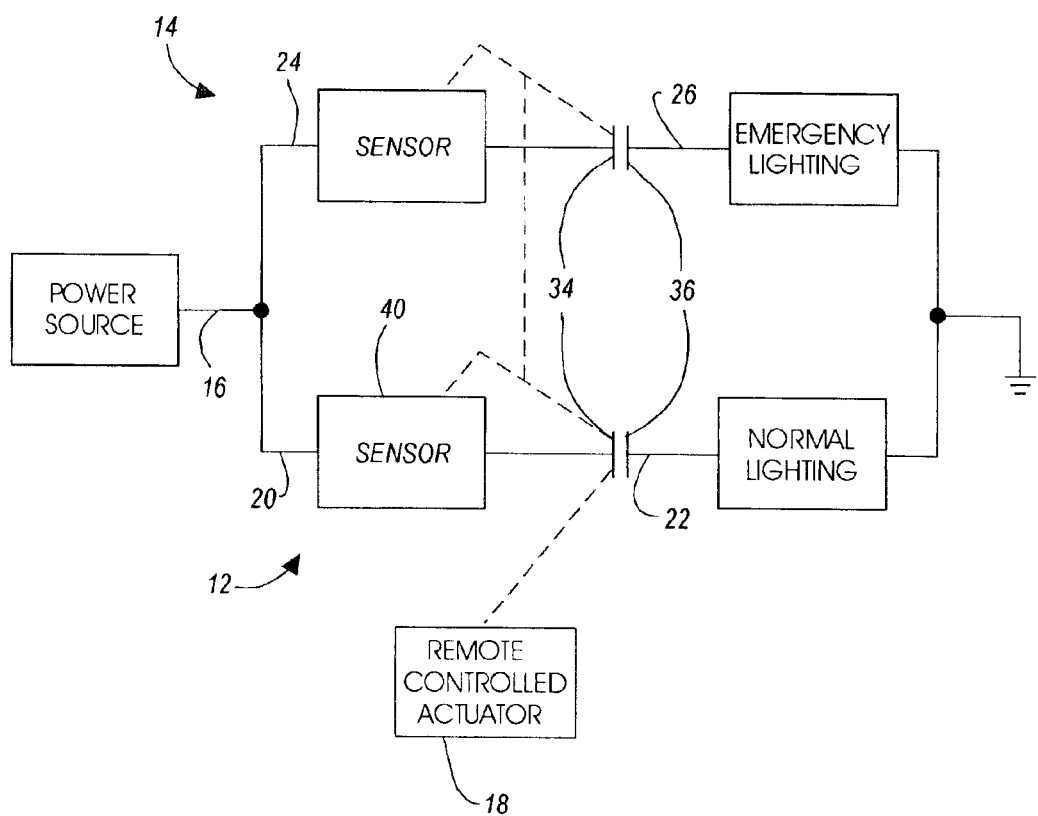
FIG. 2 is a block diagram of the functional portions of the circuit breaker of FIG. 1.

Referring now to the drawings, and initially to FIGS. 1 and 2, in one embodiment of the present invention a remote-controlled circuit breaker 10 generally comprises two pole assemblies 12 and 14, and a voltage input connector 16. The first pole assembly 12 includes a remote-controlled actuator 18, a first line contact 20, and a first load connector 22. The second pole assembly 14 includes a second line connector 24 and a second load connector 26. The remote-controlled actuator 18, which will be described in more detail below, is adapted to control only the first pole assembly 12. The input connector 16 is coupled to both the first and second line contacts 20 and 24 to supply both pole assemblies from a common power source. The first load connector 22 is connected to a normal load such as a normal lighting fixture 28, while the second load connector 26 is connected to an emergency lighting unit 30. A handle tie 32, which will be described in more detail below, provides for manual operation of the two pole assemblies.

Figure 3:
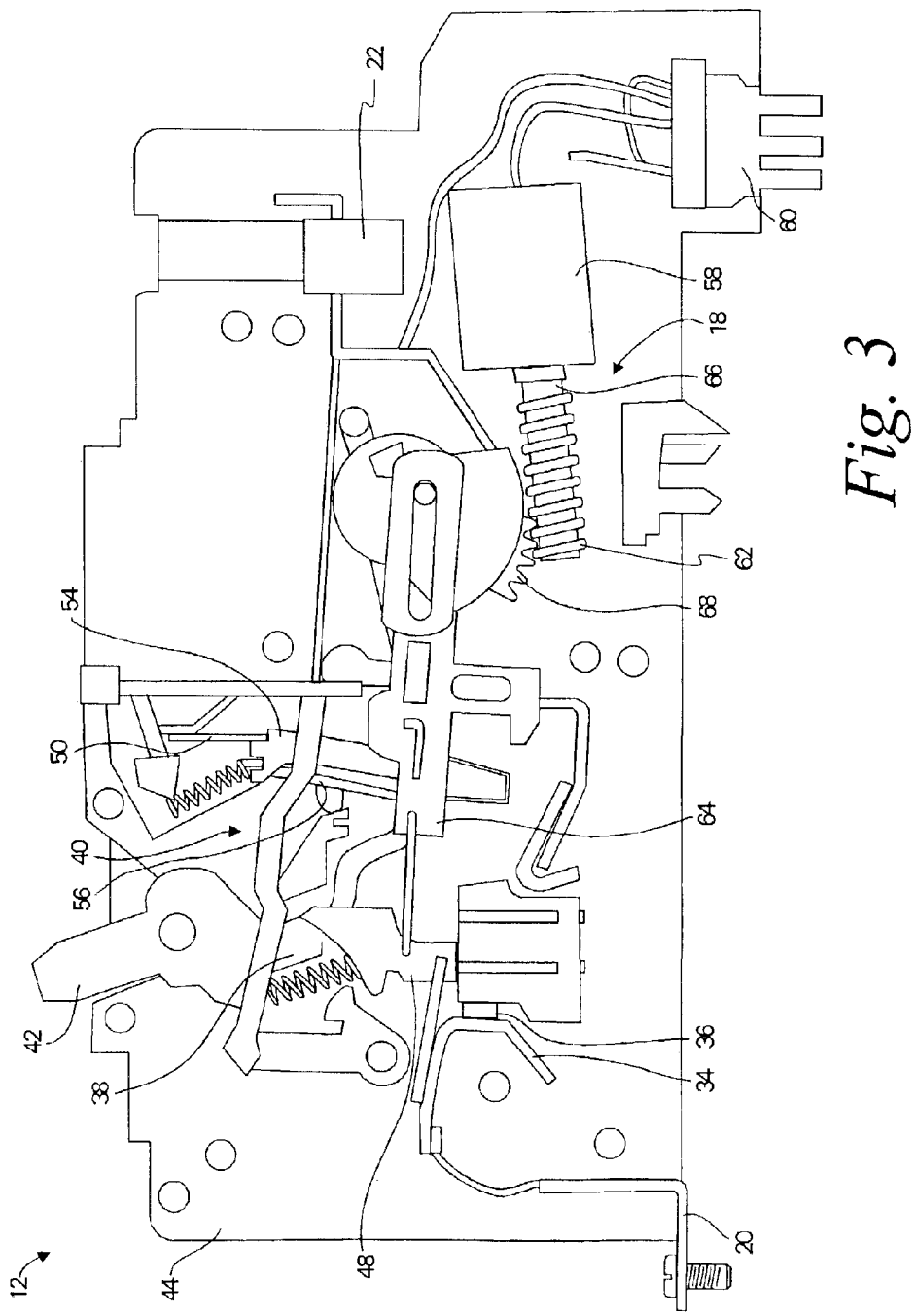
FIG. 3 is a plan view of the internal structure of the circuit breaker of FIG. 1.

Referring now to FIG. 3, other components of the first pole assembly 12 include a stationary contact 34, a movable contact 36, a switching actuator 38, a trip mechanism 40, and a first handle 42. Although only the first pole assembly 12 will be described in more detail, it will be understood that the second pole assembly 14 includes generally the same components and functions generally the same as the first pole assembly 14, except that only the first pole assembly includes a remote-controlled actuator 18.

In general, most components of the circuit breaker 20 are installed on a base 44 and enclosed therein by a cover (not shown) attached to the base. The first handle 42 protrudes through the cover for manual resetting of the first pole assembly 12. The first handle 42 also serves as a visual indication of the position of the first pole assembly 12. When the first pole assembly 12 is in the ON position, the contacts 34 and 36 are closed so that current flows through the first pole assembly 12 to a normal load, such as the normal lighting fixture 28, connected to the first load connector 22. The ON position is also referred to as a closed position. When the first pole assembly 12 is in the REMOTELY-OPEN position, the OFF position, or the TRIPPED position, the contacts 34 and 36 are separated to interrupt the flow of current to the normal load. Each one of the REMOTELY-OPEN position, the OFF position, and the TRIPPED position is also referred to as an open position. The separation distance between the contacts 34 and 36 is generally the same in both the OFF and the TRIPPED position. However, the separation distance between the contacts 34 and 36 is smaller in the REMOTELY-OPEN position than in the OFF position or in the TRIPPED position. The first handle 42 can be used to reset the first pole assembly 12, from the TRIPPED position to the ON position. The first handle 42 can also be used to switch the first pole assembly 12 between the ON position and the OFF position. However, in general, the first handle 42 does not affect the REMOTELY-OPEN position, wherein the remote-controlled actuator 18 operates generally independently of the first handle 42.

The first pole assembly 12 may be moved to an open position by using at least one of three different components. Specifically, the remote-controlled actuator 18 can move the first pole assembly 12 to the REMOTELY-OPEN position, the conventional circuit-breaker trip mechanism 40 can move the first pole assembly 12 to the TRIPPED position, and the first handle 42 can move the first pole assembly 12 to the OFF position. The trip mechanism operates in the usual manner, opening the contacts 34 and 36 in response to the presence of a current higher than the rated current over a specified period of time. Specifically, the movable contact 36 is attached to a blade 48, which is connected to the switching actuator 38. In the closed position the movable contact 36 contacts the stationary contact 34, while in the open position, i.e., the TRIPPED position, the movable contact 36 is separated from the stationary contact 34. Activation of the trip mechanism 40 thus interrupts current flow through the first pole assembly 12.

The trip mechanism 40 includes a conventional bimetal strip 50 that is thermally deflectable and is positioned proximate a trip cross bar 52. Upon the occurrence of a moderate sustained overload, the bimetal strip 50 is heated and begins to deflect toward the trip cross bar 52. Continued deflection of the bimetal strip 50 eventually moves the trip cross bar 52 to activate the switching actuator 38, which in turn causes the movable contact 36 connected to the blade 48 to move away from the stationary contact 34. The switching actuator 38 is activated when the current exceeds the rated current by a predetermined threshold over a specified period of time.

The trip mechanism 40 further includes a magnetic yoke 54 which is attached to the lower end of the bimetal strip 50, and a movable magnetic armature 56 which is coupled to the trip cross bar 52. Upon the occurrence of an extreme overload, the current passing through the first pole assembly 12 creates a magnetic force in the yoke 54 that attracts the armature 56, causing it to swing instantaneously. Similarly to the moderate sustained overload, the movement of the armature 56 causes the trip cross bar 52 to activate the switching actuator 38, which in turn causes the movable contact 36 connected to the blade 48 to move away from the stationary contact 34.

The remote-controlled actuator 18 of the first pole assembly 12 generally includes a motor 58, a signal input connector 60, a spring 62, and an actuating link 64. The signal input connector 60 is connected to the back of the motor 58 to receive signals that control the motor 58. The spring 62 is coupled to a motor shaft 66 that carries a gear 68 coupled to the actuating link 64. The actuating link 64 is in turn coupled to the blade 48. When the motor 58 is activated, the motor shaft 66 and the spring 62 rotate, which in turn causes the gear 68 to rotate. The rotation of the gear 68 moves the actuating link 64, causing the blade 48 to move. Depending on which direction the motor shaft 66 is rotating, the movement of the blade 48 causes the movable contact 36 to come into contact with, or separate from, the stationary contact 34. When the remote-controlled actuator 18 causes the movable contact 36 to be in contact with the stationary contact 34, the first pole assembly 12 is in the ON position. When the remote-controlled actuator 18 causes the movable contact 36 to be separated from the stationary contact 34, the first pole assembly 12 is in the REMOTELY-OPEN position.

The second pole assembly 14 has a trip mechanism similar to the trip mechanism 40, and both trip assemblies are operatively connected together by the trip crossbar 52, causing both pole assemblies to trip if either trips. Therefore, if a fault condition is detected by the trip mechanism 40 of either pole assembly and a tripping action occurs, then both pole assemblies 12 and 14 will be in their TRIPPED positions. As noted earlier, the second pole assembly 14 does not have a remote-controlled actuator. When the remote-controlled actuator 18 toggles the first pole assembly 12, unlike the trip mechanism 40, the toggling does not affect the second pole assembly 14. The toggling only affects the first pole assembly 12.

Because the illustrative circuit breaker provides a single electrical power source for both pole assemblies 12 and 14, the requirements of the National Electrical Code ("NEC") Article 700-12(e) are met. Specifically, the circuit breaker meets the NEC requirement that unit equipment used for emergency illumination shall be fed by "the same branch circuit as that serving the normal lighting in the area and connected ahead of any local switches."

Figure 4:
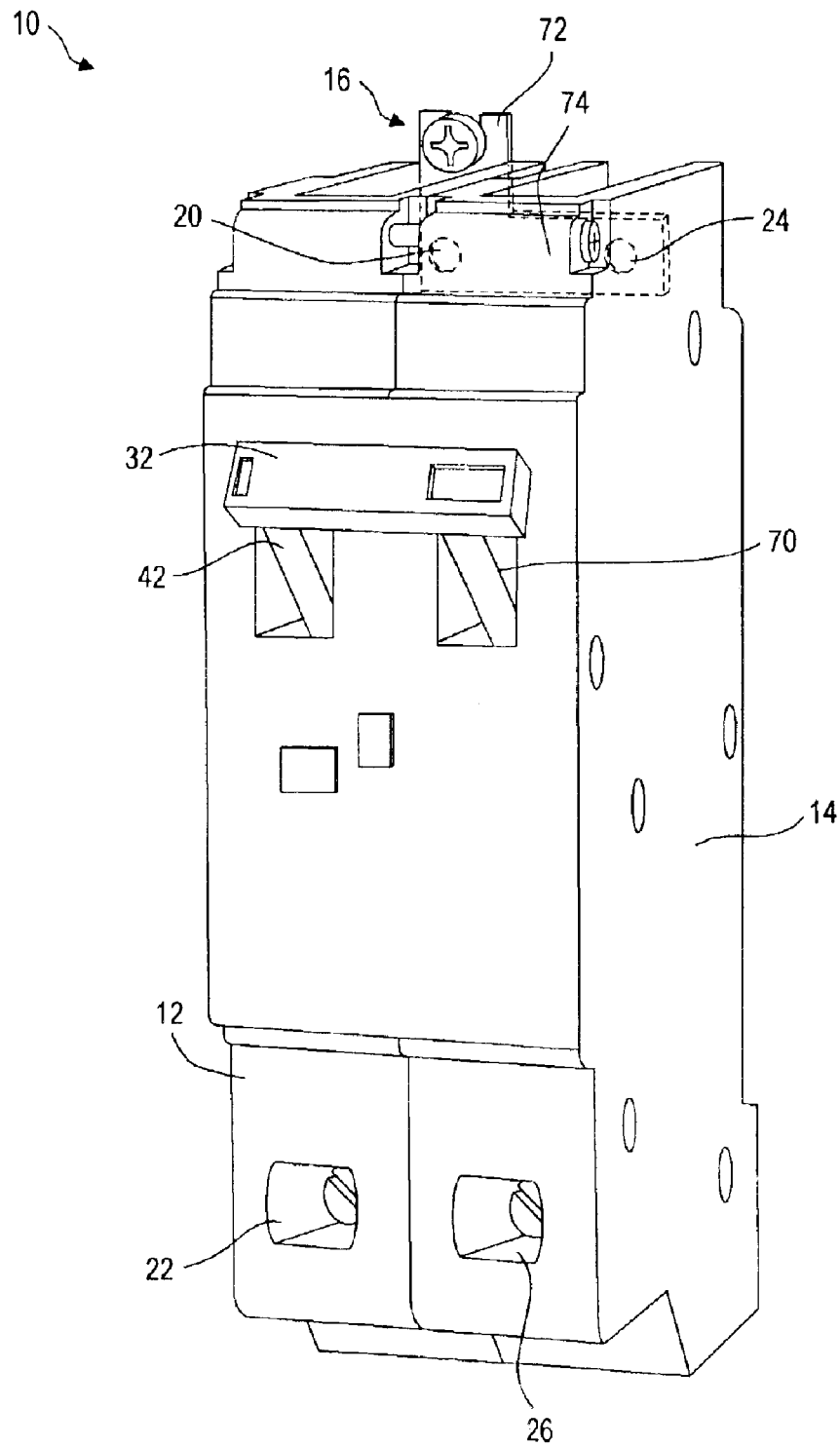
FIG. 4 is a perspective view of the circuit breaker of FIG. 1.

Referring now to FIG. 4, a handle tie 32 couples together the handle 42 of the first pole assembly 12 and a handle 70 of the second pole assembly 14. This ensures that both pole assemblies are manually switched in unison for safety and other reasons. For example, if an electrical system that is coupled to either one of the two pole assemblies requires servicing, a service person can easily interrupt electrical power to both pole assemblies simultaneously with a single movement of either handle. The voltage input connector 16 may include a bolt-on or plug-on connector 72 and a cross-connector 74. One side of the bolt-on connector 72 is electrically connected to an external power supply, while the other side is electrically connected to the cross-connector 74. In another embodiment the cross-connector 74 is an electrically conductive plate connected to both the first and second line contacts 20 and 24.

The emergency lighting unit 30, which is connected to the second pole assembly 14, includes emergency lights, an undervoltage unit, and a battery. The undervoltage unit, also known as an undervoltage relay, senses the presence or absence of voltage in the second pole assembly 14. For example, the undervoltage unit senses the presence of voltage in the second pole assembly 14 even when the first pole assembly 12, via the remote-controlled actuator 18, turns off the normal lighting fixture 28. Therefore, the emergency lights 30 will not be turned on when the normal lights 28 are turned off during scheduled times. In one embodiment of the present invention, the undervoltage unit is included in a self-contained fluorescent emergency ballast, which operates one lamp at 350 to 450 lumens. The emergency ballast can convert a new or existing fluorescent fixture into an emergency lighting fixture, wherein the ballast includes a battery, a charger, and electronic circuitry in one compact case. The emergency ballast further includes a charging indicator light and a test switch.

Figure 5:
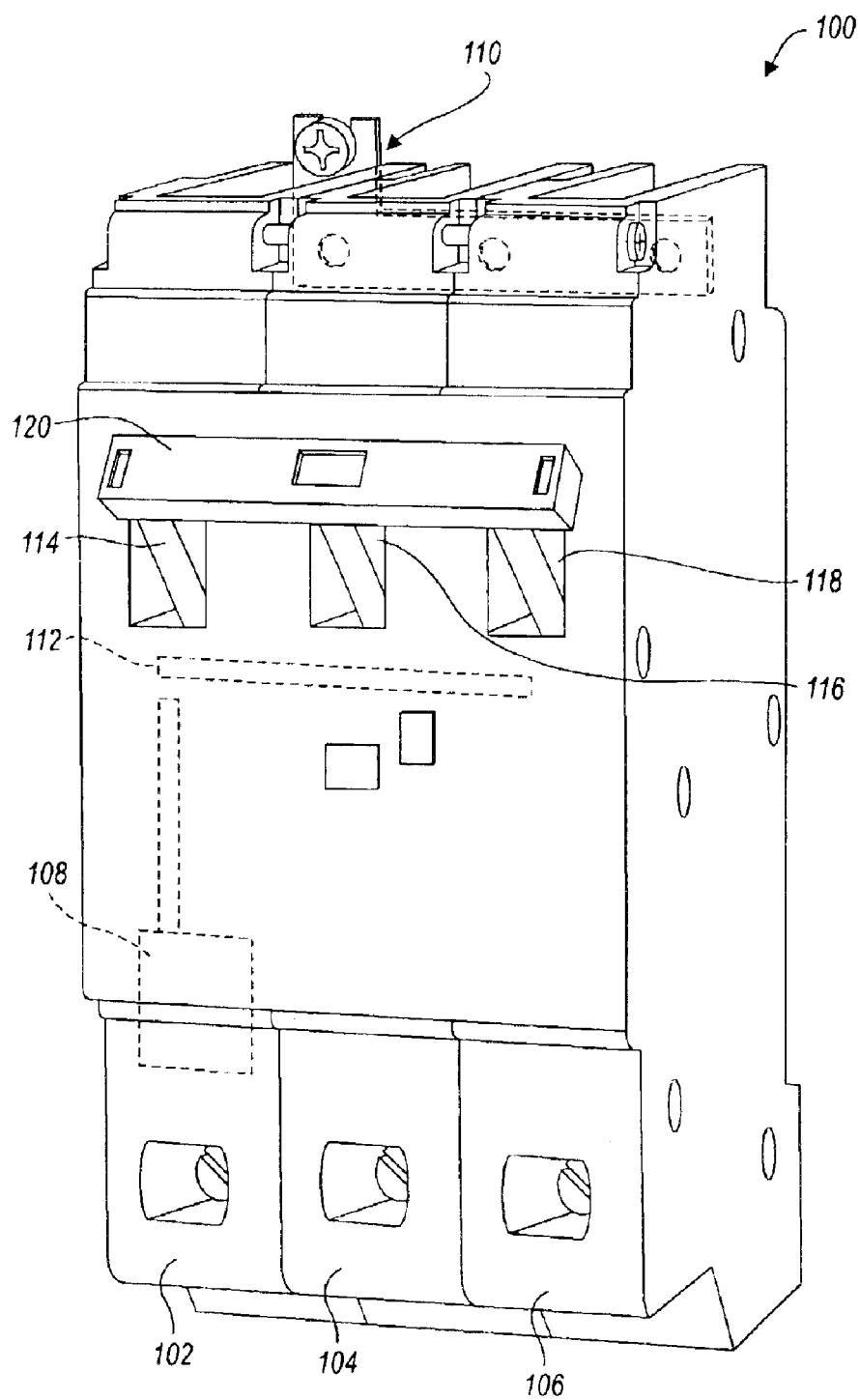
FIG. 5 is a perspective view of a modified embodiment of the present invention, having three pole assemblies.

Referring now to FIG. 5, a circuit breaker system 100 is shown having three pole assemblies, a first pole assembly 102, a second pole assembly 104, and a third pole assembly 106. In this embodiment, at least one but not all of the pole assemblies is controlled by a remote-controlled actuator 108. For example, the first pole assembly 102 includes and can be controlled by the remote-controlled actuator 108, while the second and third pole assemblies 104 and 106 do not include, and cannot be controlled by, any remote-controlled actuator. In another embodiment, the remote-controlled actuator 108 is adapted to control both the first pole assembly 102 and the second pole assembly 104, but not the third pole assembly 106.

A single power source is connected to all the pole assemblies 102, 104, and 106 using a single voltage input connector 110, and a single trip cross bar 112 is used to simultaneous trip all three pole assemblies 102, 104, 106 regardless of whether the tripping condition is sensed by one or more of the pole assemblies 102, 104, 106. The three pole assemblies include respective handles 114, 116, and 118 for manually moving the respective pole assemblies between their TRIPPED, ON, and OFF positions. A handle tie 120 couples the three handles 114, 116, and 118 to all three simultaneous manual operation of all three pole assemblies 102, 104, 106.

The pole assemblies may all be part of a single circuit breaker, e.g., a two-pole circuit breaker, or a three-pole circuit breaker. In other embodiments, each pole assembly may be used in a separate circuit breaker, e.g., two single-pole circuit breakers, three single-pole circuit breakers, or four single-pole circuit breakers.

Although the above description refers to emergency lighting applications, it will be appreciated that the present invention has other applications. For example, the remote control of at least one pole of a circuit breaker independently of at least one other pole may be useful in programming security systems, operating sprinkler systems for watering lawns, or managing major appliances.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A circuit breaker system, comprising:
   a voltage input connector adapted to receive current from an external power supply;
   a first pole assembly electrically coupled to said input connector and including a first movable contact allowing the flow of said current through said first pole assembly in a first closed position and preventing the flow of said current in a first open position; and
   a second pole assembly electrically coupled to said input connector and including a second movable contact allowing the flow of said current through said second pole assembly in a second closed position and preventing the flow of said current in a second open position, and a remote-controlled actuator operatively coupled to said second pole assembly for toggling said second movable contact between said second open position and said second closed position, said remote-controlled actuator not being operatively coupled to said first pole assembly.

2. The circuit breaker system of claim 1, further comprising a trip crossbar, said first pole assembly including a first trip mechanism operatively coupled to said first movable contact for moving said first movable contact to said first open position, said second pole assembly including a second trip mechanism operatively coupled to said second movable contact for moving said second movable contact to said second open position, said trip crossbar coupling said first trip mechanism and said second trip mechanism together so as to move said first movable contact to said first tripped position and said second movable contact to said second tripped position generally simultaneously.

3. The circuit breaker system of claim 1 further comprising:
   at least one normal lighting unit connected to said second pole assembly, and
   an emergency lighting unit connected to said first pole assembly and including emergency lights, a battery for supplying power to said emergency lights, and an undervoltage unit for connecting said battery to said emergency lights.

4. The circuit breaker system of claim 1, wherein said first pole assembly and second pole assembly are two poles of a single circuit breaker.

5. The circuit breaker system of claim 1, wherein said first pole assembly and second pole assembly are poles of two separate circuit breakers.

6. The circuit breaker system of claim 1, wherein said input connector is an electrically conductive plate.

7. The circuit breaker system of claim 1, wherein said input connector includes an electrically conductive plate and a bolt-on connection.

8. The circuit breaker system of claim 1, wherein said input connector includes an electrically conductive plate and a plug-on connection.

9. The circuit breaker system of claim 1, further comprising a handle tie, wherein said first pole assembly includes a first handle mechanically coupled to said first movable contact for manually moving said first movable contact among a plurality of first positions, said second pole assembly includes a second handle mechanically coupled to said second movable contact for manually moving said second movable contact among a plurality of second positions, said handle tie secured to said first handle and said second handle for moving together said first handle and said second handle.

10. The circuit breaker system of claim 1, wherein said first pole assembly is connected to an emergency lighting system, and said second pole assembly is connected to a non-emergency lighting system.

11. The circuit breaker system of claim 1, further comprising a third pole assembly, said third pole assembly including
   a third movable contact electrically coupled to said input connector, said third movable contact allowing the flow of said current through said third pole assembly in a third closed position and preventing the flow of said current in a third open position, said remote-controlled actuator operatively coupled to said third movable contact for toggling said third movable contact between said third open position and said third closed position.

12. The circuit breaker system of claim 2, further comprising a third pole assembly, said third pole assembly including
   a third movable contact electrically coupled to said input connector, said third movable contact allowing the flow of said current through said third pole assembly in a third closed position and preventing the flow of said current in a third open position, and
   a third trip mechanism operatively coupled to said third movable contact for moving said third movable contact to a third tripped position, said remote-controlled actuator operatively coupled to said third movable contact for toggling said third movable contact between said third open position and said third closed position, said trip crossbar coupling said third trip mechanism, said first trip mechanism, and said second trip mechanism together so as to move said third movable contact to said third tripped position, said first movable contact to said first tripped position, and said second movable contact to said second tripped position generally simultaneously.

13. The circuit breaker system of claim 1, further comprising a third pole assembly, said third pole assembly including
   a third movable contact electrically coupled to said input connector, said third movable contact allowing the flow of said current through said third pole assembly in a third closed position and preventing the flow of said current in a third open position.

14. The circuit breaker system of claim 2, further comprising a third pole assembly, said third pole assembly including
   a third movable contact electrically coupled to said input connector, said third movable contact allowing the flow of said current through said third pole assembly in a third closed position and preventing the flow of said current in a third open position, and
   a third trip mechanism operatively coupled to said third movable contact for moving said third movable contact to a third tripped position, said trip crossbar coupling said third trip mechanism, first trip mechanism, and said second trip mechanism together so as to move said third movable contact to said third tripped position, said first movable contact to said first tripped position, and said second movable contact to said second tripped position generally simultaneously.

* * * * *